(12) United States Patent
Freudelsperger

(10) Patent No.: US 7,261,509 B2
(45) Date of Patent: Aug. 28, 2007

(54) METHOD AND SYSTEM FOR OPERATING A RACKING SYSTEM PREFERABLY IN A DISPATCH UNIT

(75) Inventor: Karl Freudelsperger, Hart bei Graz (AT)

(73) Assignee: Knapp Logistik Automation GmbH (AT)

( * ) Notice: Subject to any disclaimer, the term of this patent is extended or adjusted under 35 U.S.C. 154(b) by 490 days.

(21) Appl. No.: 10/480,971

(22) PCT Filed: Jul. 26, 2002

(86) PCT No.: PCT/EP02/08347

§ 371 (c)(1),
(2), (4) Date: Dec. 11, 2003

(87) PCT Pub. No.: WO03/010074

PCT Pub. Date: Feb. 6, 2003

(65) Prior Publication Data

US 2004/0197171 A1    Oct. 7, 2004

(30) Foreign Application Priority Data

Jul. 26, 2001 (DE) ................................ 101 36 354

(51) Int. Cl.
*B65G 1/06* (2006.01)
(52) U.S. Cl. ...................... 414/269; 414/807
(58) Field of Classification Search .............. 414/278, 414/281, 279, 269, 285; 198/463.2
See application file for complete search history.

(56) References Cited

U.S. PATENT DOCUMENTS

| | | | | |
|---|---|---|---|---|
| 1,927,677 A | * | 9/1933 | Bennington | 187/244 |
| 3,337,069 A | * | 8/1967 | Burger | 414/278 |
| 3,528,566 A | * | 9/1970 | Weir | 414/285 |
| 3,622,020 A | * | 11/1971 | Sarvary | 414/279 |
| 3,661,280 A | * | 5/1972 | Atwater | 414/282 |
| 3,664,534 A | * | 5/1972 | Hunter | 414/659 |
| 3,674,159 A | * | 7/1972 | Lemelson | 414/276 |
| 3,738,506 A | * | 6/1973 | Cornford et al. | 414/273 |
| 3,779,403 A | * | 12/1973 | Young | 414/279 |
| 3,854,574 A | * | 12/1974 | Theijsmeijer et al. | 198/834 |
| 3,883,008 A | * | 5/1975 | Castaldi | 414/270 |
| 4,168,780 A | * | 9/1979 | Parrott | 211/151 |
| 4,252,217 A | * | 2/1981 | Benjamin | 414/592 |
| 4,331,418 A | * | 5/1982 | Klebe | 414/277 |
| 4,773,807 A | * | 9/1988 | Kroll et al. | 414/282 |
| 4,856,956 A | * | 8/1989 | Zur | 414/280 |

(Continued)

Primary Examiner—Charles A. Fox
(74) Attorney, Agent, or Firm—McGlew and Tuttle P.C.

(57) ABSTRACT

A method for operating a rack system preferably in a dispatch unit (1), with a rack (2) and an associated rack serving device for the storage and retrieval of containers (3), trays or the like to or from the rack. A rack region of the rack (2) has a plurality of rack planes (13) arranged one above the other and is served by a dedicated, mechanically coupled, height and length-adjustable rack serving device (4). In each track region embodied as an independent, closed rack unit (A, B, C), containers (3), trays or the like undergo interim storage in a buffer zone (P1, P2, P3) on the same level, are transferred for storage or retrieval and transported by an elevator (5; 6a, 6b) and/or a preferably horizontal transport connection (F1, F2) arranged in the region of the rack unit (A, B, C) at the same level, from or to a transport system or workplace outside the rack system.

22 Claims, 9 Drawing Sheets

U.S. PATENT DOCUMENTS

| | | | |
|---|---|---|---|
| 5,125,782 A * | 6/1992 | Goldschmidt et al. | 414/276 |
| 5,135,344 A * | 8/1992 | Kita et al. | 414/273 |
| 5,149,240 A * | 9/1992 | Di Rosa | 414/277 |
| 5,174,707 A * | 12/1992 | Suekane et al. | 414/269 |
| 5,213,463 A * | 5/1993 | Rothlisberger et al. | 414/280 |
| 5,226,782 A * | 7/1993 | Rigling | 414/283 |
| 5,237,801 A * | 8/1993 | Hillam et al. | 53/446 |
| 5,379,229 A * | 1/1995 | Parsons et al. | 700/215 |
| 5,380,139 A * | 1/1995 | Pohjonen et al. | 414/280 |
| 5,540,532 A * | 7/1996 | Carder et al. | 414/284 |
| 5,582,497 A * | 12/1996 | Noguchi | 414/281 |
| 5,669,748 A * | 9/1997 | Knudsen, Jr. | 414/273 |
| 5,953,234 A * | 9/1999 | Singer et al. | 700/214 |
| 6,042,321 A * | 3/2000 | Labell | 414/276 |
| 6,113,336 A * | 9/2000 | Chang et al. | 414/281 |
| 6,222,699 B1 * | 4/2001 | Luffel et al. | 360/92 |
| 6,778,351 B1 * | 8/2004 | Coffin et al. | 360/92 |

\* cited by examiner

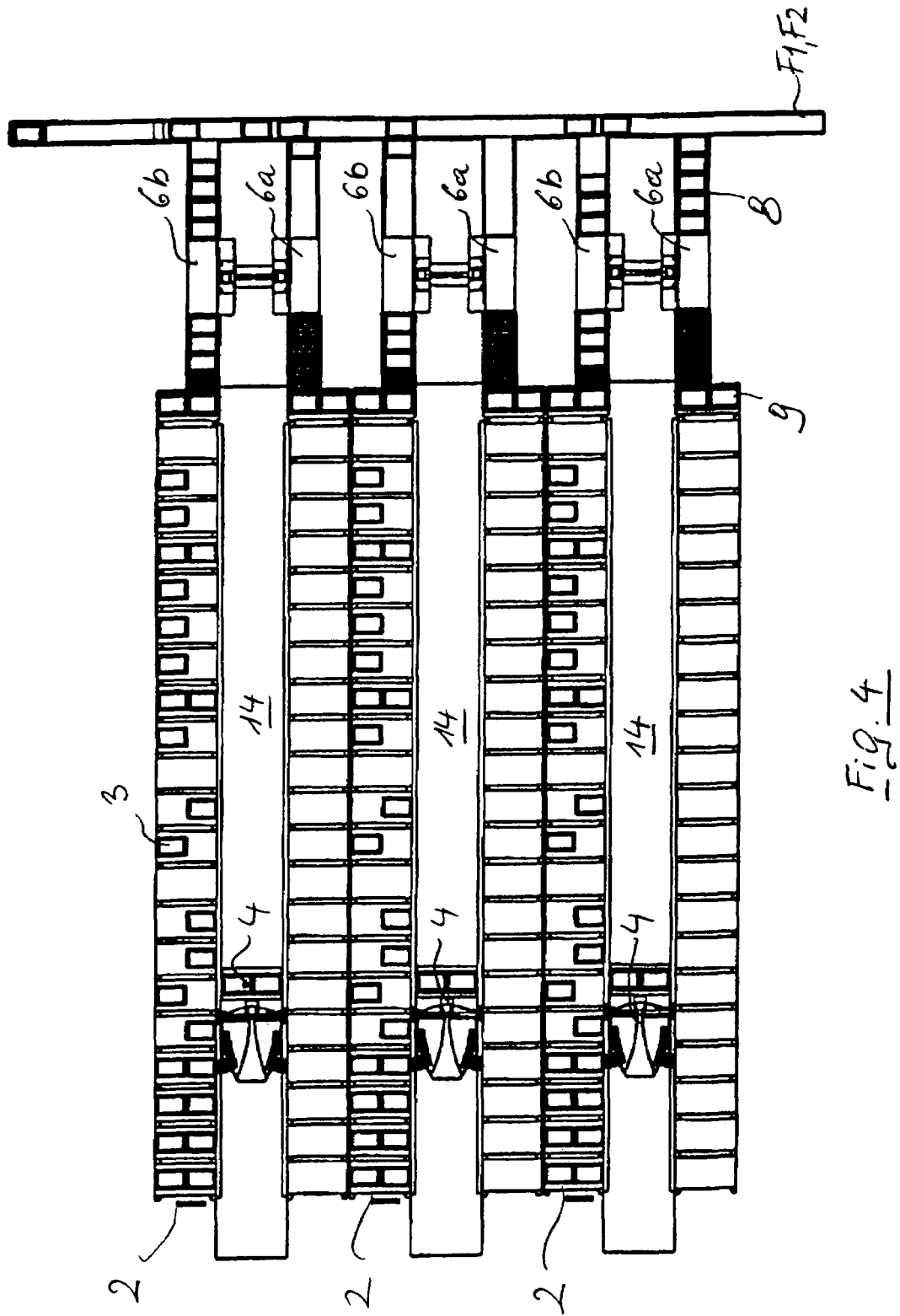

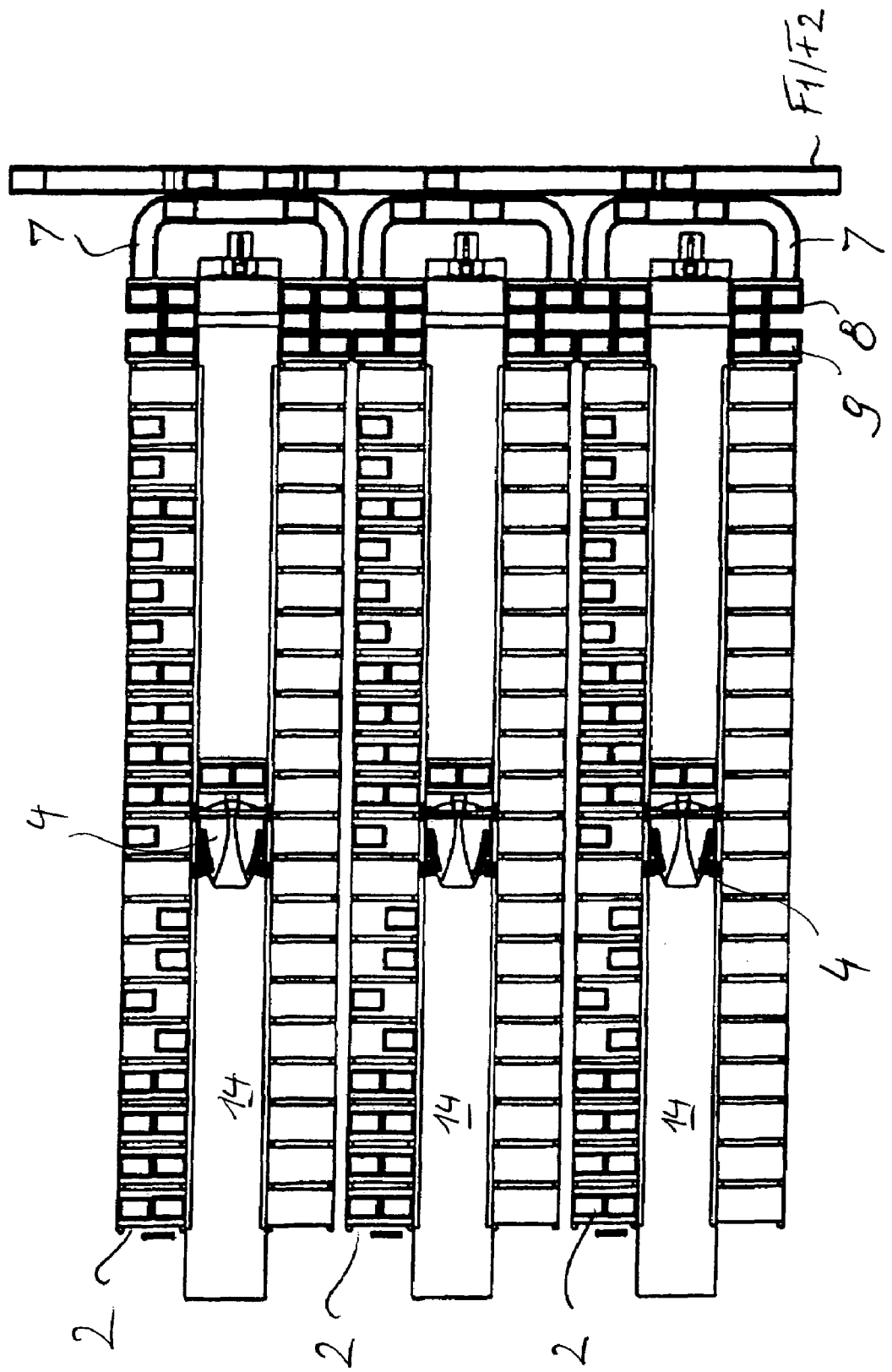

METHOD AND SYSTEM FOR OPERATING A RACKING SYSTEM PREFERABLY IN A DISPATCH UNIT

FIELD OF THE INVENTION

The present invention pertains to a method and a system for operating a rack system preferably in a dispatch unit, with a rack and an associated rack serving device for the storage and retrieval of containers, trays or the like into or out of the rack.

Whenever the term "container" is used below it shall not be defined in a limiting manner; the present invention rather also comprises systems in which other transport units, e.g., trays or pallets are used to store and transport the product to be dispatched.

BACKGROUND OF THE INVENTION

According to a known prior art, containers are removed from a container storage area and sent via a height-adjustable rack serving device, which can be displaced along the container storage area, to a central distribution system, which joins the container storage area. In particular, the rack serving device serves two opposite storage racks over the entire height of the rack (cf. DE 197 12 839 A1). The limited dispatch output and inflexibility of the rack serving system is a disadvantage.

SUMMARY OF THE INVENTION

The object of the present invention is essentially to make the prior-art method and system more efficient and to correspondingly make available with simple means an efficient method and an efficient serving system for operating a rack system preferably in a dispatch unit.

The essence of the method according to the present invention is that a rack region of the rack system, which rack region comprises a plurality of rack planes arranged one above the other, is served by a dedicated, mechanically coupled, height- and length-adjustable rack serving device, and that containers, trays or the like, which are taken over by the rack serving device for storage or released for retrieval and are transported by means of at least one elevator and/or a transport connection from or to a transport system or workplace located outside the rack system, are stored on an interim basis in a buffer zone located on the same level as an interface to the outside in each rack region embodied as an independent and closed rack unit.

The containers are preferably transported via the horizontal transport connection arranged on the same level in the region of the rack unit without crossing to or from an individual workplace, especially to or from an individual dispatch place of a dispatch unit, preferably on a closed path, in a so-called "loop."

Consequently, the rack in a rack serving system according to the present invention is divided into at least two rack regions arranged one above the other, which comprise a plurality of adjacent rack planes arranged one above the other each, wherein each rack region has as an independent and closed rack unit a dedicated, mechanically coupled, height- and length-adjustable rack serving device. Each rack serving device preferably covers a working range of about 4 m of rack height. Each rack region comprises, in particular, a transfer station, which is a rigid part of the rack and is located on the same level, with a buffer zone as an interface to the outside and, furthermore, at least one elevator, which joins the buffer zones and is preferably a rigid part of the rack, and/or a transport connection, which is connected to each buffer zone and is preferably a rigid part of the rack in the rack region, for feeding or removing containers, trays or the like to or from a transport system or workplace located outside the rack system, preferably without crossing, to and from an individual dispatch place of a dispatch unit ("product-to-man system"). A plurality of containers, usually containers or boxes, can be picked up and deposited from the vehicle or rack serving device in the buffer zone. The buffer zone stores the products until they can be taken over by the elevator system. The individual, independent and closed planes or rack units and the materials handling technology located outside the rack system are linked with one another by an elevator or with a transport connection. As a result, a highly flexible interface can be created with the materials handling technology located outside the rack system and, in particular, a high dispatch capacity can be set up.

Advantages of the system according to the present invention over the prior-art system:

As many planes or rack units as desired can be arranged one above another. Rack heights of 20 m or higher can be attained in a simple manner. The height of the overall system is limited only by the stability of the rack system and the elevator mast.

The throughput of the system is higher than in prior-art systems with only one vehicle or rack serving device for the overall height of the rack system (as for instance 3,661,280-Atwater). The throughput is determined, besides by the number of rack serving devices, essentially by the elevator system or the transport system used for the connection, which links the individual rack serving devices with the materials handling technology located outside the rack system.

Each plane or rack unit of the rack system is accessible by means of a ladder. Each rack unit is enclosed in itself. Service and repair operations can thus be performed on each rack unit separately, without having to put the entire system out of operation. This is an essential advantage compared with the prior-art rack serving device. The safety of the overall system against failure is thus increased in the longer term.

The individual vehicles or height-adjustable rack serving devices, which are longitudinally displaceable at a rack front, are built up such that the mast is arranged centrally at the elevating chassis. As a result, the actions of forces due to the acceleration and braking of the vehicle or elevating platform can be minimized, and a lightweight design can be optimally implemented.

By using an elevator system as a link between the individual planes or rack units and the materials handling technology located outside the rack system, it is possible to serve a larger number of transfer points and buffer zones of the rack serving vehicles in a simple and effective manner. If a separate elevator is used for the storage and retrieval of products, high throughputs are possible even in the case of a small storage area.

Another advantage is that the vehicles or rack serving devices are compatible, and a rack serving device can be replaced with a new or different, existing rack serving device in a simple manner.

It is possible to serve two planes or two rack units of the rack system with a feeding and removing materials handling technology. The difference in height is achieved by an elevating or lowering movement.

Each plane or each rack unit has an independent, enclosed functional area. As a result, separate interfaces of the materials handling technology can be served as a dedicated overall system. This property can also be utilized in separate planes as a "product-to-man system." This means that a plurality of independent rack serving systems function in a single mechanical rack system. Optimal use over a plurality of planes of a building is possible as a result.

Each plane or each rack unit can be operated as a "stand-alone solution" in respect to the electronic control means. However, it is also possible to integrate a plurality of systems in one control.

The entire rack system can be optimally used for different types of containers. This means that, e.g., boxes can be dynamically stored and managed in one plane region, but normal containers are stored and managed in another plane system. Furthermore, the planes or rack units may also differ in the number of storage depths. This means that one plane or rack unit is used for two-deep storage, and the other plane or rack unit is used for single-depth or four-deep storage. The great advantage is the optimal utilization of the rack system and the simplicity of the load-carrying means used. The load-carrying means can be optimally adapted to the requirements. It is also possible, e.g., to arrange special storage means such as flow racks in each plane or rack unit and to serve them with load-carrying means specially designed for them.

The rack serving device system is integrated within the rack. The rack accommodates the guiding system for the vehicle system and is thus considered to be an integrated system.

Due to the low overall height of the vehicle system, the overall system is very service-friendly, because the individual planes or rack units can all be reached in a simple manner.

If a plurality of plane systems serve one plane system or if a plurality of plane systems are integrated in a single plane system, the throughput is guaranteed by corresponding buffer systems and connection systems.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 4 is a schematic top view of the rack serving system according to FIG. 1;

FIG. 10 is a schematic top view of the rack serving system according to FIG. 7.

DESCRIPTION OF THE PREFERRED EMBODIMENTS

Figure 6:
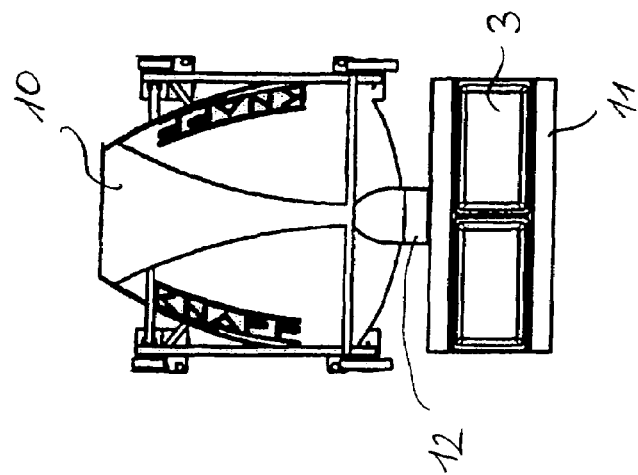
FIG. 6 is a schematic top view of the rack serving device according to FIGS. 1 through 4.
Figure 5:
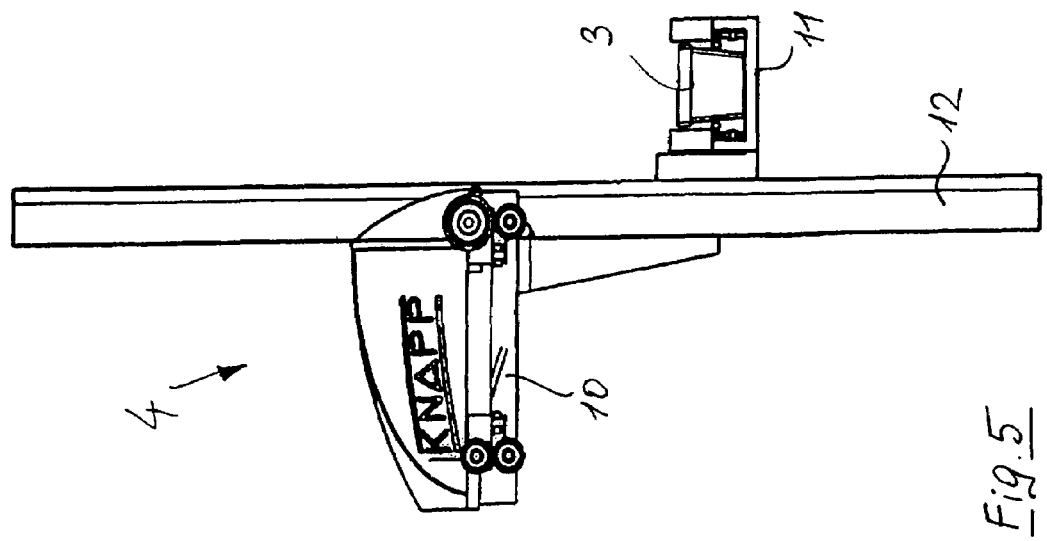
FIG. 5 is a schematic side view of the rack serving device according to FIGS. 1 through 4.
Figure 7:
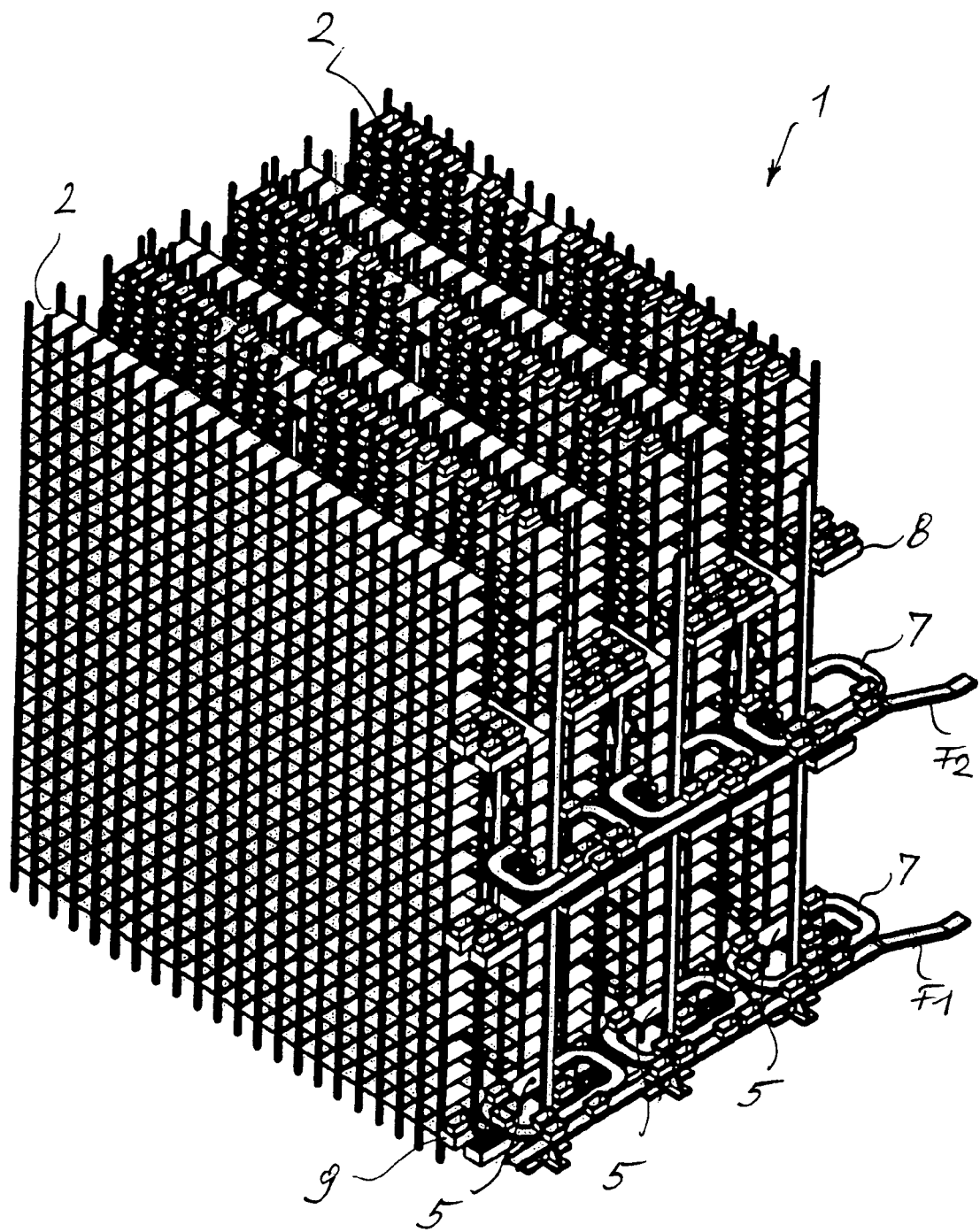
FIG. 7 is a schematic perspective view of another embodiment variant of a rack serving system according to the present invention of a dispatch unit corresponding to FIGS. 1 through 4.
Figure 8:
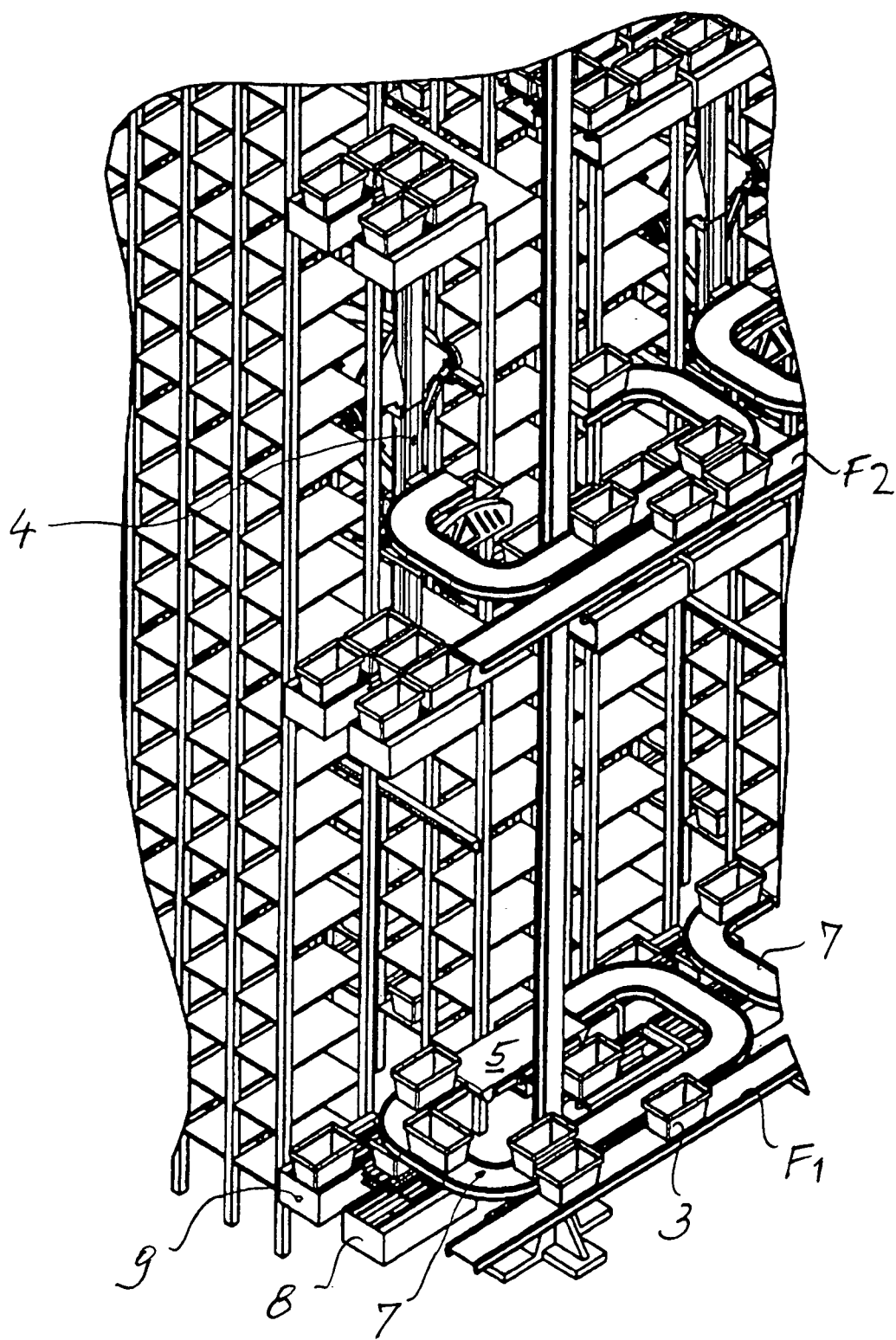
FIG. 8 is an enlarged detail of the rack serving system according to FIG. 7.
Figure 9:
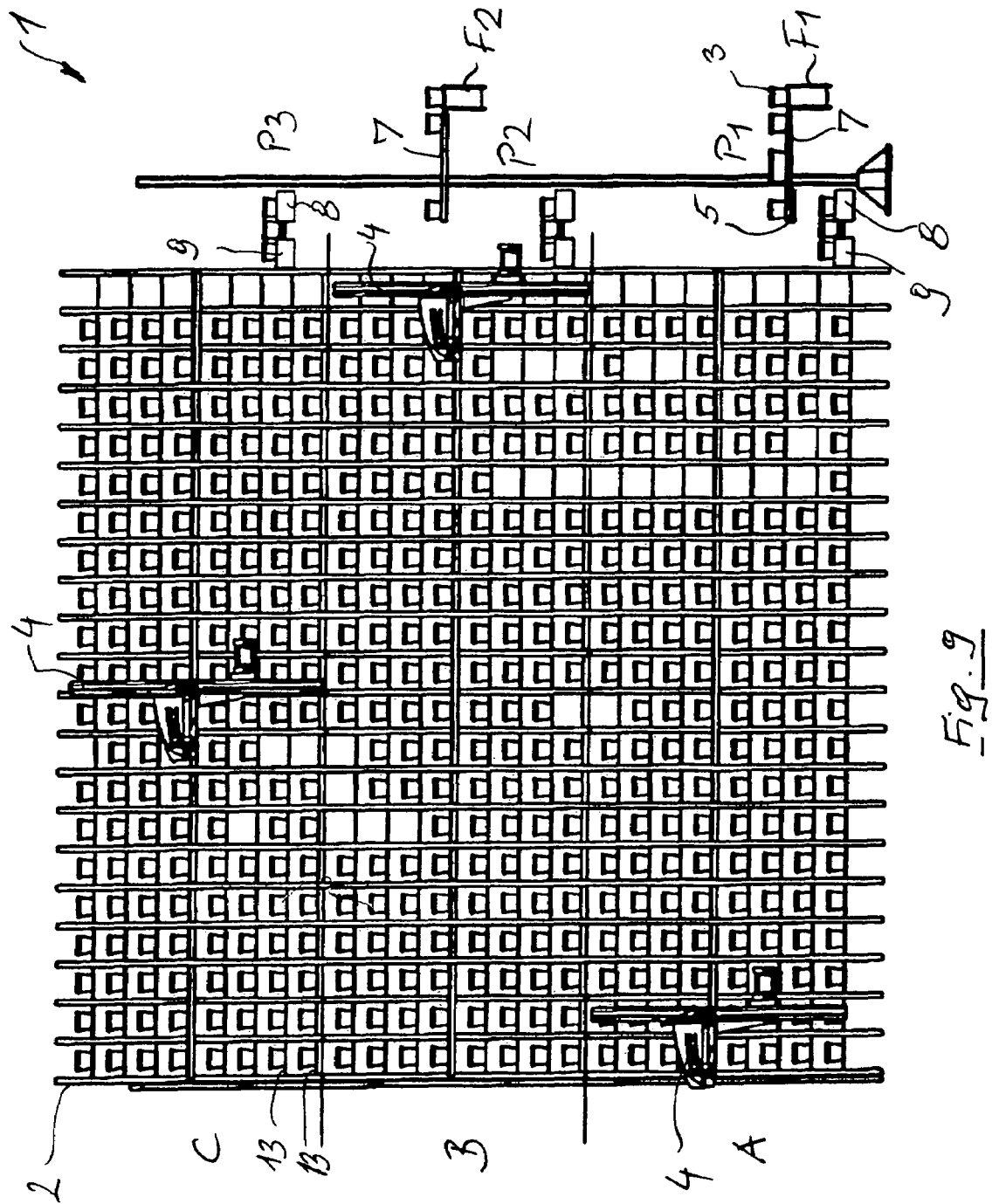
FIG. 9 is a schematic side view of the rack serving system according to FIG. 7.

Referring to the drawings in particular, according to the drawings, the container storage area of a dispatch unit 1 comprises a composite rack 2 comprising three double racks in a parallel arrangement with longitudinally displaceable rack serving devices 4 according to FIGS. 5 and 6, which are arranged in the rack aisles 14.

Figure 1:
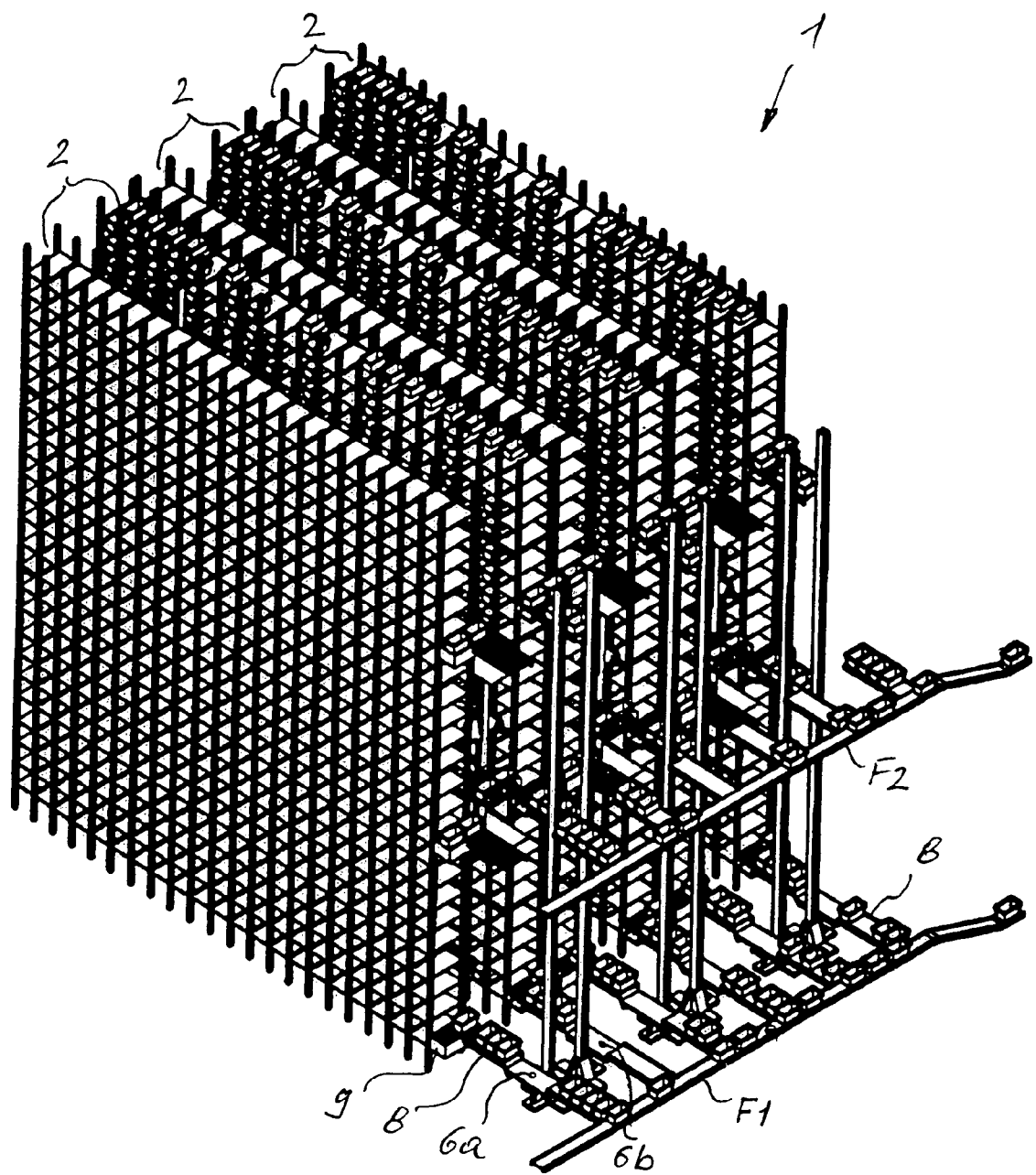
FIG. 1 is a schematic perspective view of a rack serving system according to the present invention of a dispatch unit, with a composite rack comprising three double racks and three rack serving devices at different heights of the rack.
Figure 2:
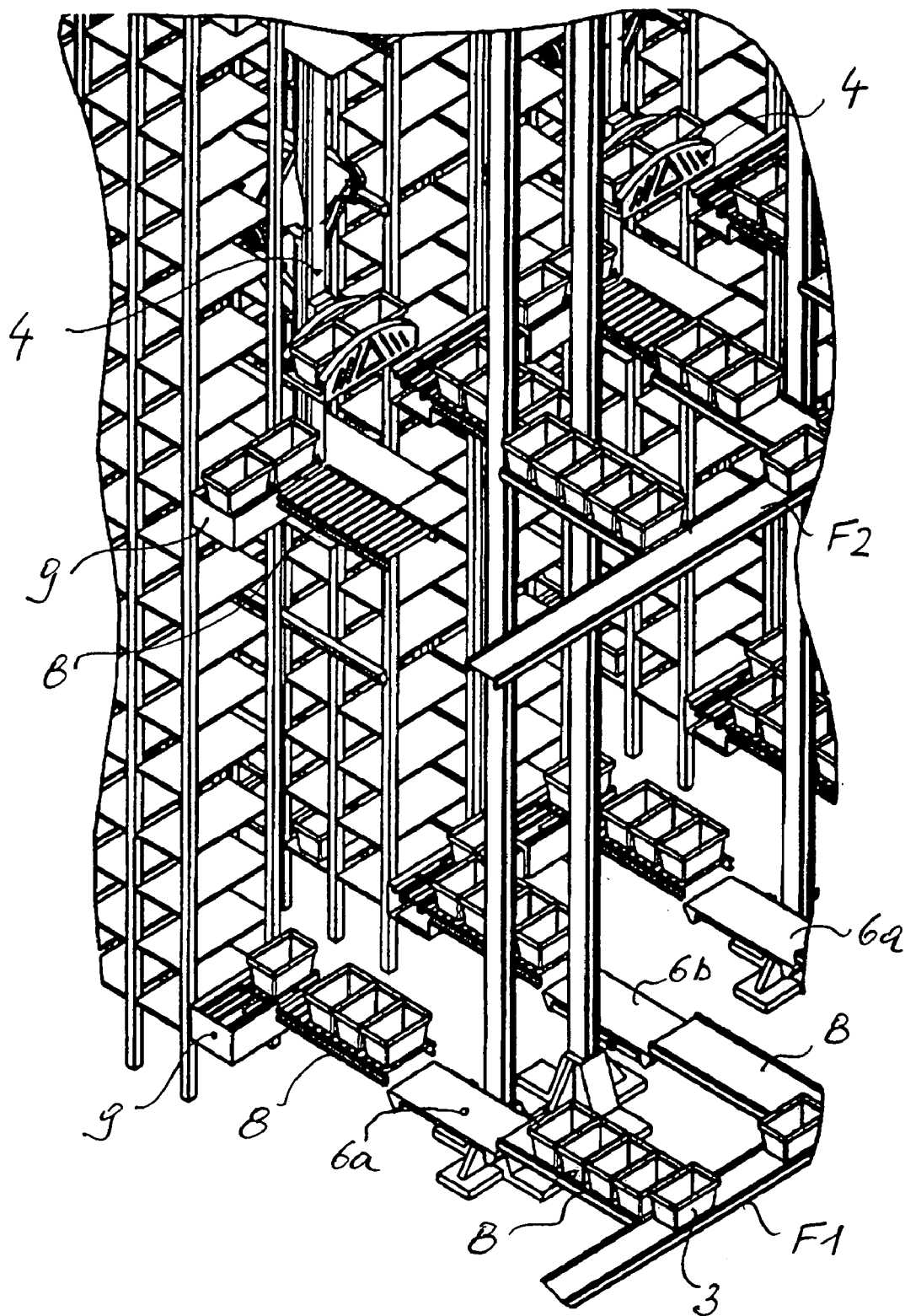
FIG. 2 is an enlarged detail of the rack serving system according to FIG. 1.
Figure 3:
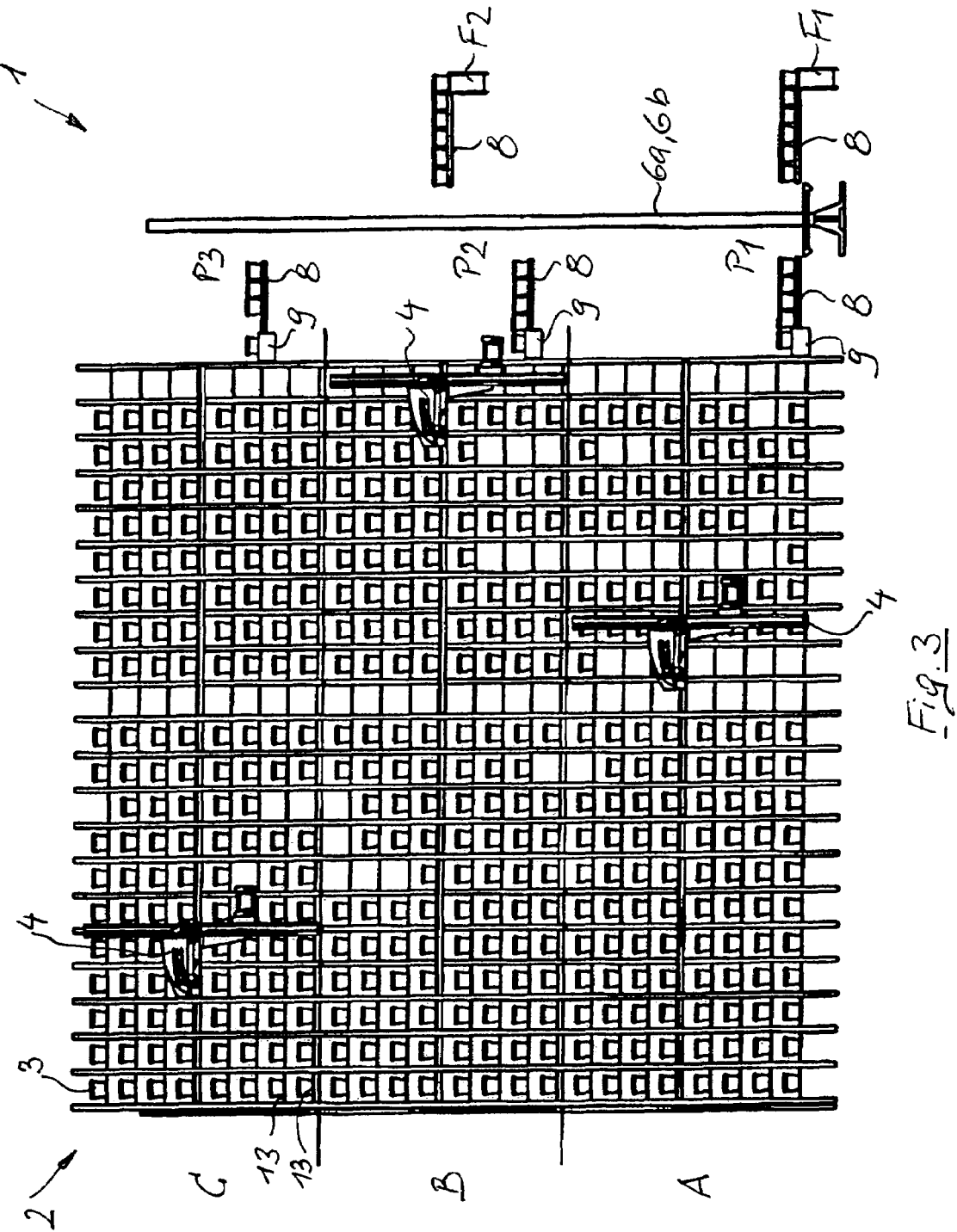
FIG. 3 is a schematic side view of the rack serving system according to FIG. 1.

As can be best recognized from FIGS. 3, 4 as well as 9 and 10, a dedicated rack serving device 4 is associated with each rack aisle 14. The overall height of the rack is divided into three rack regions, which are arranged one above the other and comprise eight rack planes 13 arranged one above the other each, wherein each rack region has a dedicated, mechanically coupled, height-and length-adjustable rack serving device 4 as an independent and closed rack unit A, B and C.

The rack serving device 4 has an elevating chassis 10 and an elevating platform 11 of a small overall height essentially at the same height, the elevating chassis 10 and the elevating platform 11 being arranged on opposite sides of a longitudinally displaceable, driven elevator mast 12. The elevator mast 12 extends over the height of each rack unit A, C and C and is guided at least at its longer longitudinal end in a longitudinal guide rail, which is an integral part of the rack 2.

Each rack region or each rack unit A, B, C has a transfer station which is a rigid part of the rack and is located on the same level with a buffer zone P1, P2 and P3, respectively, for containers 3, in which said buffer zone containers are taken over by the rack serving device 4 for storage or are released for retrieval, and, furthermore, elevators 6a, 6b, which are rigid parts of the rack and are connected to the buffer stations in the first embodiment variant according to FIGS. 1 through 4, or elevators 5 which are rigid parts of the rack in the second embodiment variant according to FIGS. 7 through 10, and two horizontal transport connections F1, F2, which are connected to the buffer stations P1, P2, are rigid parts of the rack and are located on the same level in the rack region, for feeding or removing containers 3 from or into a transport system or workplace (not shown), which is located outside the rack system.

The transport connection F1 and F2, which is on the same level in the region of the rack unit A, B, C, is led without crossing as a closed transport loop directly to and from an individual workplace, especially directly to and from an individual dispatch place of a dispatch unit, and containers dispatched from the rack 2 are transported on the said transport loop to the workplace and conversely, empty containers or partially emptied containers 3 are transported from the workplace to the rack 2.

A dedicated electronic control means for the storage and retrieval of containers 3 is provided for each rack unit A, B and C.

As an alternative, a common electronic control means may also be provided for at least a plurality of preferably adjacent rack units.

In both exemplary embodiments according to FIGS. 1 through 4 as well as according to FIGS. 7 through 10, the buffer zone P1, P2 and P3 has stationary parking spaces 9 at the rack 2 at the level of each rack unit A, B, C for the interim storage of containers 3.

Furthermore, the buffer zone P1, P2 and P3 comprises, in both embodiment varients, open linear horizontal conveyor tracks 8, likewise at the level of each rack unit A, B, C, on which containers 3 can likewise be transported and stored on an interim basis.

Finally, the buffer zone P1, P2 and P3 according to the second embodiment variant according to FIGS. 7 through 10 comprise, furthermore, a preferably closed horizontal conveyor track 7 or a conveying loop arranged on the same level with a connection to an elevator 5, on which said track or loop containers can be transported and stored on an interim basis and transferred to the elevator 8 or taken over from the elevator 8. The containers 3 are fed and removed here by means of the common elevator 5, contrary to the first embodiment variant according to FIGS. 1 through 4, in which the containers 3 are fed and removed by means of elevators 6a, 6b.

Each rack unit A, B or C is accessible by means of a ladder.

The composite rack 2 may have rack units A, B, C, which have different designs at least partially in terms of the depth of the rack, the height of the rack and/or the container type supports. In particular, special storage means, especially flow racks, may be arranged in the rack units A, B, C.

Two-sided rack serving devices 4, which serve two rack halves each in the corresponding rack aisle 14, are used in the composite rack 2 comprising three double racks arranged one after another according to the drawings. It is apparent that racks 2 may also be provided within the framework of the present invention in the form of parallel individual racks located at spaced locations from one another and optionally combined with double racks, in which case the individual racks can be served by rack serving devices located on one side, which can be displaced at the front of the rack. However, the racks 2 are divided into independent rack units A, B, C in the vertical direction in all embodiment variants.

The first embodiment variant according to FIGS. 1 through 4 is operated by means of rack serving devices 4 according to FIGS. 5 and 6 as follows.

Product to be dispatched is dispatched manually in containers 3 at two individual dispatch places, not shown, which are connected to the transport connections F1 and F2 without crossing.

Empty or partially emptied containers 3 (or full containers for filling the rack) enter the region of the linear conveyor track 8 connected vertically to the elevator 6a on the circulating transport connection F1 and F2. The containers are transferred there onto the linear conveyor track 8 by cross slides, not shown and undergo interim storage. The elevator 6a takes over a container located there and transports same onto the level of a selected rack unit A, B or C, in which a free storage site is present according to the computer control with path optimization. Once the level of the selected rack unit is reached, the elevator 6a takes over the container 3 of the linear conveyor track 8 located there, which leads to the stationary parking space 9 located on the same level. The container is then ready on the parking space 9 for removal by the rack serving device 4 of the corresponding rack unit A, B or C on the front side of the rack 2. The actuated rack serving device 4 moves to this parking space 9 and takes over the container 3 from there onto the aligned elevating platform 11. The rack serving device 4 then performs accelerated and decelerated movement horizontally and at the same time vertically in the rack aisle 14 to the empty storage site of the rack unit A, B or C and fills the empty storage site with the container 3.

A container 3 polled by the dispatch unit is retrieved from the rack essentially in the opposite direction. However, after leaving the rack serving device 4, the selected container 3 is brought on a separate conveyor track to the transport connection F1 and F2. The separate conveyor track is represented by the stationary parking space 9 and the linear conveyor track 8, which are associated with the elevator 6b. A dispatched container 3 transferred by this linear conveyor track 8 to the transport connection F1 and F2 reaches the dispatch unit without crossing.

Consequently, containers 3 are stored and retrieved on separate paths up to the rack serving device 4 according to the first embodiment variant.

The second embodiment variant according to FIGS. 7 through 10 is operated by means of rack serving devices 4 according to FIGS. 5 and 6 similarly to the operation of the first embodiment variant. However, a common elevator 5 is used both for the storage and the retrieval of containers 3, which has a correspondingly large platform and can pick up containers to be stored and retrieved at the same time. The elevator 5 is integrated in each buffer zone P1, P3 or P3 in a closed circulating, horizontal conveyor track 7, on which containers 3 are fed and removed, as can be seen, on separate paths between the transport connection F1 and F2 and the elevator 5.

While specific embodiments of the invention have been shown and described in detail to illustrate the application of the principles of the invention, it will be understood that the invention may be embodied otherwise without departing from such principles.

The invention claimed is:

1. A method for operating a rack system with a rack and an associated rack serving device for the storage and retrieval of objects to or from the rack, the method comprising:

providing the rack divided into at least two vertical rack regions arranged one above the other, with each rack region comprising a plurality of adjacent rack planes arranged one above the other, wherein each rack region is an independent and closed rack unit each with a height-movable and length-movable rack serving device dedicated to each rack region and mechanically coupled to each rack region;

serving each rack region of the rack-with the respective rack serving device by moving objects with the respective serving device to locations in the respective rack region and retrieving objects from locations in the respective rack region;

transporting objects from or to a level of the respective rack region by at least one of an elevator and an at least partially horizontal transport connection that reaches on the same level in the rack region of the rack unit from or to a transport system or workplace located outside the rack system; and storing the objects on an interim basis in an interim storage in each said rack region in a buffer zone arranged on the same level.

2. A method in accordance with claim 1, wherein transporting includes transporting the objects via the transport connection without crossing to or from an individual workplace, or to or from an individual dispatch place of a dispatch unit.

3. A method in accordance with claim 1 wherein, serving includes using a dedicated electronic control means for each rack unit for the storage and retrieval of said objects.

4. A method in accordance with claim 1, wherein serving includes using a common electronic control means for a plurality of adjacent rack units for the storage and retrieval of said objects.

5. A method in accordance with claim 1, wherein storing the objects includes transporting the objects in one direction and storing the objects on an interim basis in the buffer zone on a closed conveyor track in the buffer zone.

6. A method in accordance with claim 1, wherein storing the objects includes transporting the objects and storing the objects on an interim basis in the buffer zone on a open and linear conveyor track in the buffer zone.

7. A method in accordance with claim 1, wherein storing the objects includes temporarily positioning the objects in stationary parking spaces in the buffer zone.

8. A method in accordance with claim 1, wherein said transporting objects from or to a level of the respective rack region includes providing said at least one elevator as plural separate elevators and feeding and removing using said separate elevators.

9. A rack serving system comprising:
a rack divided into at least two vertical rack regions arranged one above the other, with each rack region comprising a plurality of adjacent rack planes each arranged one above the other, wherein each said rack region is embodied as an independent and closed rack unit;
a dedicated, mechanically coupled, height-movable and length-movable rack serving device for each rack unit;
a transfer station for each rack unit, the transfer station being a rigid part of the rack;
a buffer zone, said transfer station being arranged on the same level with said buffer zone for said objects, in which said buffer zone objects are taken over for storage or are released from storage for retrieval; and
a transport comprising at least one of a transport connection that ends horizontally in the rack region and an elevator, said transport being connected to the buffer zone and forming a rigid part of the rack for feeding or removing said objects to or from a transport system or workplace located outside the rack system.

10. A rack serving system in accordance with claim 9, wherein said transport comprises the transport connection, which is arranged on the same level in the region of the rack unit, is led without crossing directly to and from an individual workplace, as a closed circulating conveyor track, on which containers dispatched from the rack are transported to the workplace and conversely, said containers in an empty or partially emptied state are transported from the workplace to the rack.

11. A rack serving system in accordance with claim 10, wherein said containers, are fed and removed by means of said separate elevators.

12. A rack serving system in accordance with claim 10, wherein a common electronic control means is provided for at least a plurality of preferably adjacent rack units for the storage and retrieval of said containers.

13. A rack serving system in accordance with claim 9, wherein a dedicated electronic control means is provided for each said rack unit for the storage and retrieval of said objects.

14. A rack serving system in accordance with claim 9, wherein said transport comprises said elevator and the buffer zone has a closed and horizontal conveyor track with a connection to said elevator, on which said conveyor objects are conveyed in one direction and stored on an interim basis and are transferred to the elevator or are taken over from the elevator.

15. A rack serving system in accordance with claim 9, wherein the buffer zone has an open, linear, horizontal conveyor track, on which said containers, trays or the like are conveyed and undergo interim storage.

16. A rack serving system in accordance with claim 9, wherein the buffer zone has stationary parking spaces at the rack for the interim storage of said objects.

17. A rack serving system in accordance with claim 9, wherein each said rack unit is accessible by means of a ladder.

18. A rack serving system in accordance with claim 9, wherein said rack units different as to at least one of depth of the rack, height of the rack and type of object that can be moved and stored therein.

19. A rack serving system in accordance with claim 9, wherein the rack has said rack units, in which special storage means including flow racks, are arranged.

20. A rack serving system in accordance with claim 9, wherein the rack is composed of a number of parallel individual racks located at spaced locations from one another or double racks, wherein the individual racks are served from a front of the rack by said rack serving devices located on one side and the double racks are served in a rack aisle located between them by said two-sided rack serving devices.

21. A rack serving system in accordance with claim 9, wherein the rack serving device has an elevating chassis and an elevating platform of a low overall height essentially at the same level, wherein the elevating chassis and the elevating platform are arranged on opposite sides of a longitudinally displaceable elevator mast.

22. A rack serving system in accordance with claim 21, wherein the elevator mast extends over the height of a rack unit and is guided at least at the bottom in a longitudinal guide rail, which is an integral part of the rack.

* * * * *